United States Patent [19]

Föhl

[11] Patent Number: 4,703,949
[45] Date of Patent: Nov. 3, 1987

[54] PASSIVE SAFETY BELT COMPRISING A DRIVE MEANS FOR MOVING AN END FITTING

[75] Inventor: Artur Föhl, Schorndorf-Haubersbronn, Fed. Rep. of Germany

[73] Assignee: TRW Repa GmbH, Alfdorf, Fed. Rep. of Germany

[21] Appl. No.: 849,854

[22] Filed: Apr. 9, 1986

[30] Foreign Application Priority Data

Apr. 23, 1985 [DE] Fed. Rep. of Germany ....... 3514639
Jan. 9, 1986 [DE] Fed. Rep. of Germany ....... 3600416

[51] Int. Cl.$^4$ .................. A62B 35/02; B60R 21/10
[52] U.S. Cl. ..................................... 280/804; 297/477
[58] Field of Search ............... 280/801, 802, 803, 804;
180/268; 192/71, 103 B, 103 C; 297/475, 478, 483, 477

[56] References Cited

U.S. PATENT DOCUMENTS

| | | | |
|---|---|---|---|
| 3,237,729 | 3/1966 | Proctor | 297/477 |
| 3,797,603 | 3/1974 | Loomba | 297/477 |
| 3,876,031 | 4/1975 | Stouffer | 297/477 |
| 3,880,364 | 4/1975 | Andres | 297/477 |
| 3,908,928 | 9/1975 | Okada | 297/477 |
| 4,251,091 | 2/1981 | Weissner et al. | 280/804 |
| 4,280,584 | 7/1981 | Makishima | 297/477 |
| 4,313,622 | 2/1982 | Suzuki et al. | 280/804 |
| 4,317,583 | 3/1982 | Pilhall | 280/804 |
| 4,335,902 | 6/1982 | Motonami | 280/803 |
| 4,445,604 | 5/1984 | Rogers, Jr. | 280/804 |
| 4,519,652 | 5/1985 | Kamijo | 297/477 |
| 4,603,877 | 8/1986 | Espinoza et al. | 280/803 |
| 4,655,477 | 4/1987 | Takada | 280/804 |

FOREIGN PATENT DOCUMENTS

2156926  5/1973  Fed. Rep. of Germany.
2927404  2/1980  Fed. Rep. of Germany.
3007739  10/1981  Fed. Rep. of Germany.

Primary Examiner—Richard A. Bertsch
Attorney, Agent, or Firm—Tarolli, Sundheim & Covell

[57] ABSTRACT

The drive means of the passive safety belt is provided with a coupling which is disposed between the takeoff side of the worm gearing and a cable drum (28) and which is formed by a toothed slider (20) and two internally toothed rings (29, 30) at the inner face of the cable drum (28). Said coupling is controlled by an inertia disk (25) in whose radial grooves (23, 24) guide studs (21, 22) of the toothed slider (20) are guided slidingly. The coupling is not engaged until an adequately high drive speed is reached, said engagement being effected in that the toothed slider (20) is moved radially outwardly and with one of its coupling teeth (31, 32) comes into engagement with the corresponding internally toothed ring (29, 30). When the coupling is disengaged the end fitting of the safety belt can be easily displaced by hand.

19 Claims, 9 Drawing Figures

PASSIVE SAFETY BELT COMPRISING A DRIVE MEANS FOR MOVING AN END FITTING

The present invention relates to a passive safety belt system. Such a passive safety belt system includes a drive means for moving an end fitting along a guide via a flexible pulling and pushing means which is operatively coupled to an electric motor drive via a transmission preferably formed by a worm gearing.

In such conventional passive safety belt systems the pulling and pushing means consists for example of a plastic-sheathed steel cable which is coiled and uncoiled on a cable drum. Said cable drum is driven by an electric motor with following worm gearing. At the ends of the guide of the end fitting limit switches are disposed which when the respective end position of the fitting is reached are actuated and stop the electric motor.

In other constructional forms as pulling and pushing means a perforated band of plastic material is used whose perforation engages with the drive toothing at the outer periphery of a cylindrical transmission element which is coupled to the takeoff side of the intermediate worm gearing. The guide rail provided for the guiding has two tracks so that parallel to the perforated band a fitting suspended therein is entrained.

Passive safety belts must function for many years without maintenance and must be extremely reliable. If the drive means for moving the end fitting should nevertheless fail for some reason it must be possible for the occupant of the vehicle to be able to move the end fitting manually into the required end position in order to fasten the belt. The manual adjustment of the end fitting into the normal wearing position should be possible without applying a high force.

Since the intermediate gearing is usually a worm gearing and is therefore self-locking, manual displacement of the end fitting cannot however take place until said fitting is disengaged from the pulling and pushing means. When the pulling and pushing means is a perforated plastic band this may for example be done in that the end fitting is disengaged from the perforation of the plastic band. When the pulling and pushing means is constructed as plastic-sheathed steel cable the end fitting is however generally fixedly connected to the steel cable so as to be entrained therewith so that manual operation is only possible in that the armature of the electric motor or the gearing worm driven thereby is manually rotated, which can be done for example by means of a screwdriver or the like but is very time consuming because a large number of revolutions is required to move through the complete travel path of the end fitting.

In the known passive safety belts the manual movement of the end fitting to the wearing position necessary in the case of a fault is exceedingly tedious so that in many cases the occupant cannot be expected to make use of the possibility of manual application of the safety belt.

A primary object of the invention is to provide an improved passive safety belt system having drive means for moving the end fitting along its guide and allowing the end fitting, when said drive means should fail, to be easily and rapidly moved by hand into the necessary end position for fastening the safety belt.

In the passive safety belt system according to the invention the pulling and pushing means is normally uncoupled from the drive means as long as the drive means is in the inoperative state so that the end fitting can be easily moved by hand in both directions. The coupling interposed between the takeoff side of the transmission formed for example by a worm gearing and the transmission member in drive engagement with the pushing and pulling means is not engaged until the electric motor is switched on; only when the coupling is engaged are the takeoff side of the transmission and the transmission member coupled fixed in rotation to each other.

In a simple and economical embodiment of the invention which can be made on a mass production scale the coupling is mechanical and is based in particular on the relative displacement between a coupling member and a control member with inherent inertia, thereby ensuring that the coupling can only engage when the drive means drives with a speed of rotation adequate to produce the relative movement of the control member caused by inertia. Thus, when the drive of the passive safety belt is not operating or is not operating properly the coupling remains disengaged so that easy adjustability of the end fitting by hand is ensured.

In more complex embodiments the coupling is an electromagnetic clutch and comprises two coupling members which are controlled by magnetic force in frictional engagement or form-locking engagement. The control of the electromagnet of the electromagnetic clutch responds to the function of the drive means so that the coupling can only be engaged when the drive means is operating properly.

A further object of the invention is to provide a passive safety belt system comprising an end fitting movable along a guide via a pulling and pushing means, a rotatably drivable drum to which the one end of the pulling and pushing means is anchored and on which the pulling and pushing means can be coiled under tension and uncoiled therefrom under thrust, and an encapsulation surrounding the drum in spaced relationship to form a receiving space for the pulling and pushing means. In a passive safety belt system of this type the end of the pulling and pushing means is provided for example with a pressed-on angled cable eye stiffener which is engaged in a cutout at the periphery of the drum on the one axial side thereof. During driving of the end fitting in the thrust direction by rotating the drum function disturbances can occur in that the end fitting is inhibited directly or indirectly in its movement, for example held firmly or jammed, and as a result the drive motor driving the drum develops a high torque near its short-circuiting torque. This high torque can lead to buckling of the portion of the pulling and pushing means disposed between the inlet and outlet opening and the peripheral surface of the drum. This buckled portion of the pulling and pushing means can jam in the receiving space formed between the peripheral surface of the drum and the encapsulation surrounding the latter. The pulling and pushing means jammed in this manner can neither be uncoiled nor further coiled. Manual actuation for shifting the end fitting is also not then possible.

The invention is based on the recognition that a solution of this problem by limiting the drive torque, for example by means of a slip coupling, is not favourable because the normal operating torque at low temperatures and the resulting stiffness of the pulling and pushing means is already very close to the short-circuiting torque of the drive motor; if a slip coupling were inserted in normal operation at low temperatures the function would no longer be reliably insured.

A further object of the invention is therefore to solve the problem occurring in a passive safety belt system of the above mentioned type and consisting in improving the functional reliability by reliably avoiding any buckling and the resulting jamming of the pulling and pushing means in the region of the drum even when the movement of the pulling and pushing means in the thrust direction is directly or indirectly inhibited in some manner.

In accordance with the invention an inlet and outlet opening for the pulling and pushing means is arranged on the one axial side of the drum periphery orientated at least approximately tangentially to the periphery of the drum and that the end of the pulling and pushing means on the opposite axial side of the drum periphery is held on the drum in such a manner that the axial inclination thereof to the peripheral direction of the drum is limited to an angle which is small enough to prevent under increased shearing stress a buckling or bending of the pulling and pushing means towards the side of the inlet and outlet opening.

The invention is based on the knowledge that a jamming of the pulling and pushing means by buckling thereof occurs in particular if its end anchored pivotally to the periphery of the drum can be pivoted to such an extent that the pulling and pushing means bears on the radial boundary wall of the receiving space which is opposite the side at which the pulling and pushing means is anchored. Said means then assume with increasing compressing an S form, also bearing on the opposite radial boundary wall of the receiving space. On further compression the pulling and pushing means can then yield into the portion of the receiving space which considered in the peripheral direction of the drum and in the uncoiling direction thereof is disposed behind the inlet and outlet opening for the pulling and pushing means. There, the pulling and pushing means can then jam unreleasably. This problem is solved according to the invention in simple manner in that the anchored end of the pulling and pushing means is prevented from assuming an excessive axial inclination to the peripheral direction of the drum. The magnitude in practice of the angle of inclination of the end to the peripheral direction depends on the stiffness of the pulling and pushing means. It has been found expedient to limit this inclination angle by stop means to at the most 45°, preferably about 30°. According to an embodiment which is simple and thus particularly advantageous as stop means an insert groove for the end of the pulling and pushing means is provided in the surface of the drum. It is further advantageous to anchor the end of the pulling and pushing means at a radial angle of inclination to the peripheral direction of the drum at the one end face thereof, preferably in that the end of the pulling and pushing means is inserted or suspended in a recess or cutout of the end face. If the pulling and pushing means is anchored to the peripheral surface of the drum preferably a cutout formed corresponding to the pivot angle is provided in the peripheral surface of the drum to anchor the pulling and pushing means therein and at the same time limit the angle of inclination thereof with respect to the peripheral direction.

According to a further advantageous embodiment of the invention in the end position of the end fitting which corresponds to the pulling and pushing means uncoiled from the drum the anchoring point of the end of said pulling and pushing means in the peripheral direction is spaced from the inlet and outlet opening a distance which is at least equal to the axial width of the drum. In this manner an excessive curvature of the pulling and pushing means in its end portion between the anchoring point at the drum and the inlet and outlet opening is avoided, particularly when the end of the pulling and pushing means is secured in the tangential or peripheral direction of the drum to the latter.

A particularly expedient compact embodiment comprises a drum with cylindrical peripheral surface. In other embodiments the peripheral surface of the drum has the form of a truncated cone.

Further advantages and features of the invention will be apparent from the subsidiary claims, the following description of examples of embodiment and the drawings, to which reference is made.

Figure 1:
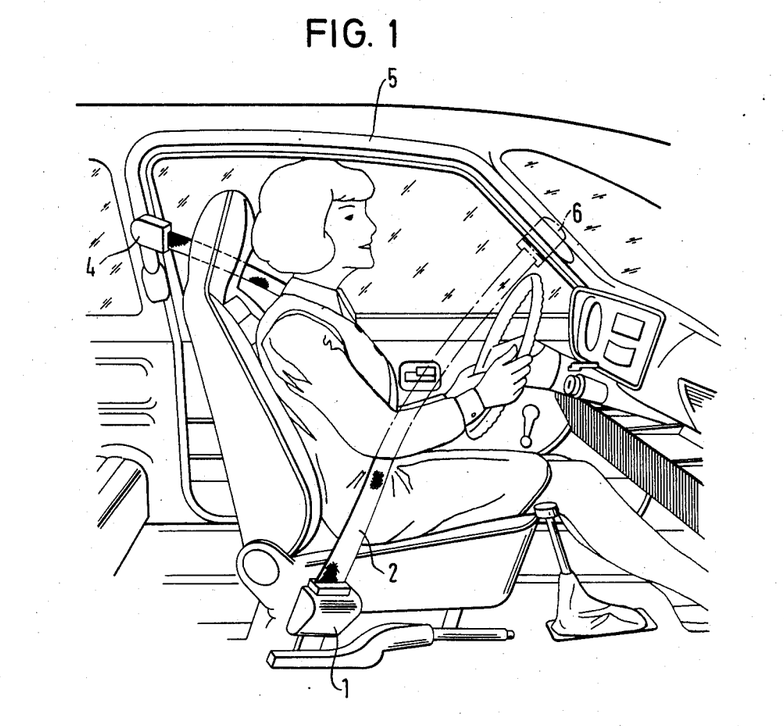
FIG. 1 is a schematic perspective view of a passive safety belt in a motor vehcile.

The passive safety belt system incorporated into a motor vehicle and shown in FIG. 1 comprises a belt takeup means 1 which is secured to the vehicle bodywork or seat and on which a belt band 2 of the safety belt is coiled, an end fitting 4 at the free end of the belt band 2 and a guide rail 5 for guiding the end fitting 4 between a belt fastening position and a rest position.

The belt fastening position is indicated in FIG. 1 with full lines; the rest position, which can also be referred to as getting-in or getting-out position, is indicated in dot-dashed line and denoted by the reference numeral 6.

Figure 2:
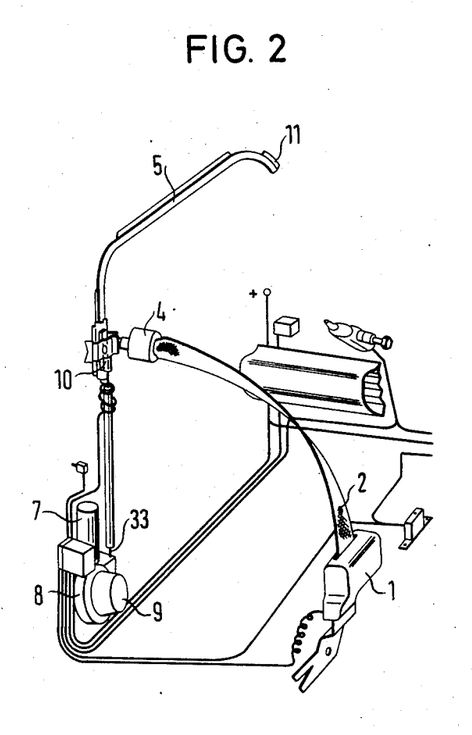
FIG. 2 is a schematic illustration of the guide and drive system for an end fitting of the passive safety belt shown in FIG. 1.

The drive and guide system for the passive safety belt illustrated schematically in FIG. 2 includes a drive means with an electric motor 7, a gearing 8 and a drum takeup means 9. Furthermore, in FIG. 2 at the two ends of the guide rail which correspond to the fastening, i.e. wearing, position and the rest position associated limit switches 10 and 11 are shown. These limit switches are actuated when the end fitting has reached the associated end position. The drive of the end fitting 4 in the embodiment illustrated is via a sheathed cable whose plastic-sheathed steel cable 33 is guided in an outer sheath.

Figure 3:
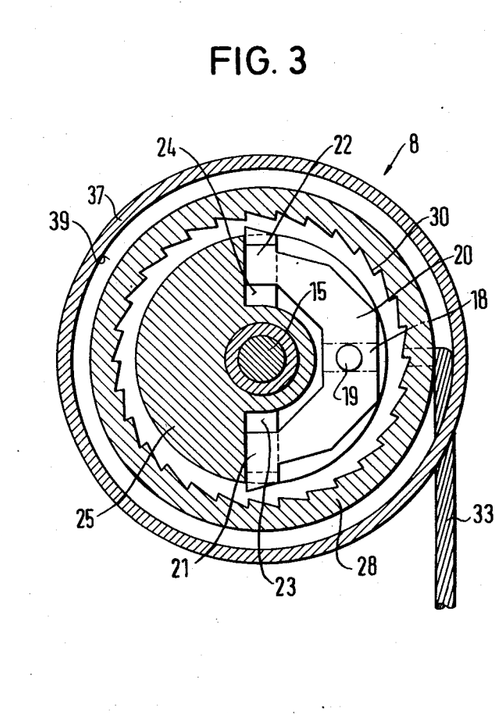
FIG. 3 is a cross-section of a coupling of the drive means along the line III—III of FIG. 4.
Figure 4:
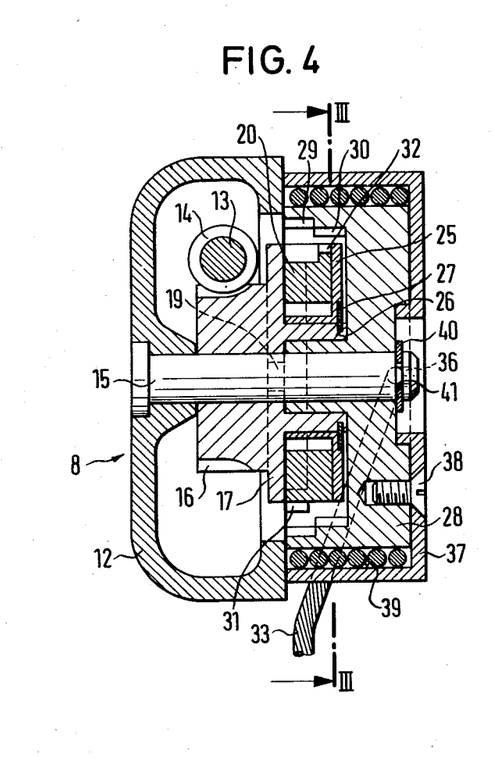
FIG. 4 is a longitudinal section of the drive means.
Figure 5:
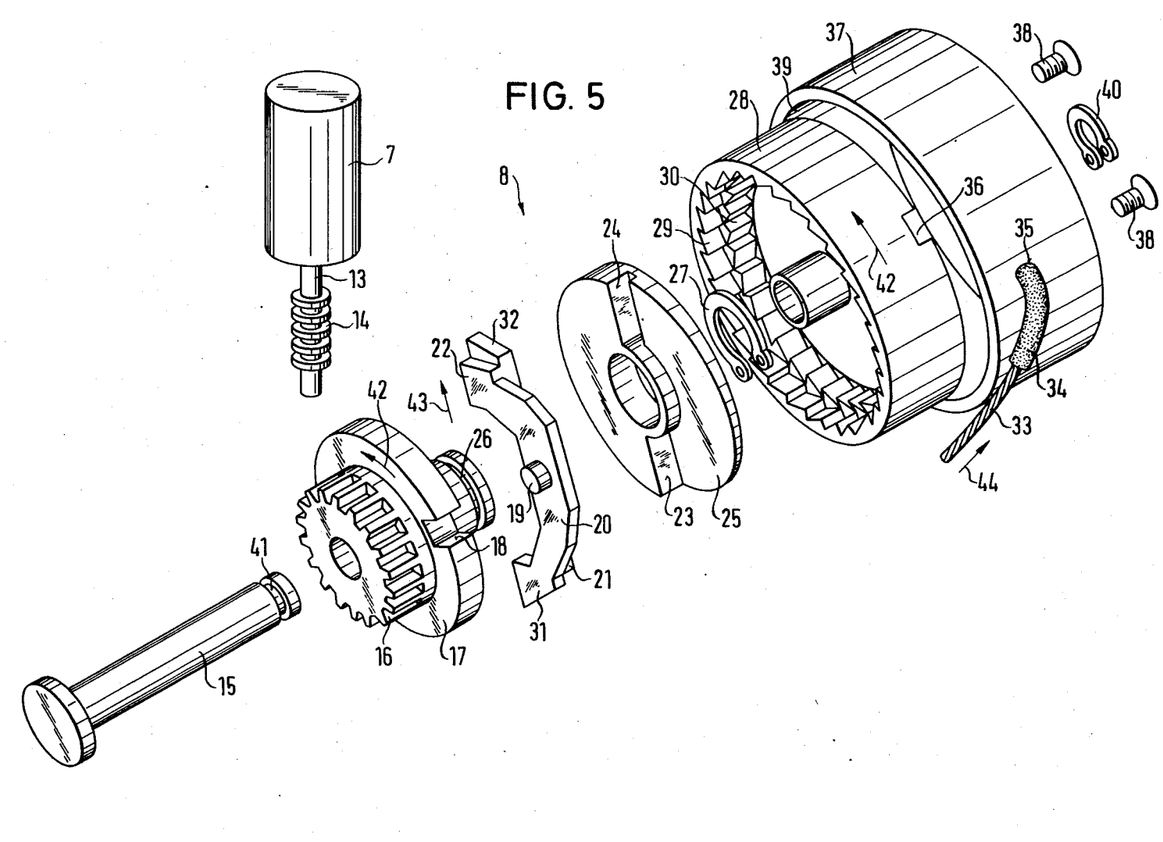
FIG. 5 is an exploded view of the drive means.

One mechanical embodiment of a coupling disposed between the takeoff side of the gearing 8 and the drum takeup means 9 is illustrated in FIGS. 3 to 5.

The gearing 8 is a worm gearing disposed in a gear housing 12. Flanged to the gear housing 12 is an electric motor 7. The drive shaft 13 of the electric motor is formed at its free end as worm 14. A worm wheel 16 is rotatably mounted on a bearing pin 15 pressed into the gear housing 12. The worm wheel 16 meshing with the worm 14 is made integral with a flange 17 which comprises a radial groove extending radially inwardly from its outer periphery. Engaging with slight play in said radial groove 18 is a stud-shaped extension 19 of a toothed slider 20 forming a coupling member. Said toothed slider 20 comprises guide studs 21 and 22 which are slidingly displaceable in matching radial grooves 23, 24 of an inertia disk 25. The radial grooves 23, 24 of the inertia disk 25 extend from the outer periphery of the inertia disk 25 inwardly up to the vicinity of a hub portion of the inertia disk 25 and lie on a common diameter thereof. The inertia disk 25 is a balanced metal disk. The worm wheel 16 comprises on its side facing the inertia disk 25 a hub which extends through the centre bearing opening in the hub portion of the inertia disk 25 and comprises a groove 26 into which a securing ring 27 is inserted by which the coupling member formed by the worm wheel 16, flange 17, toothed slider 20 and inertia disk 25 is held axially on the bearing pin 15.

As transmission element cooperating with the plastic-sheathed steel cable 33 at least one approximately hollow cylindrical cable drum 28 is provided on the inner face of which an inner toothing is formed which consists of two internally toothed rings 29, 30 adjacent each other in the axial direction. The toothing of the internally toothed rings 29, 30 has a saw-tooth cross-section with a pronounced difference in length between the tooth rear and front flanks and the toothings of the internally toothed rings 29, 30 are disposed directed oppositely to each other.

The cooperating members of the coupling are the toothed slider 20 and the internally toothed rings 29, 30 formed integrally with the cable drum 28. The toothed slider 20 comprises at its radially outer end in each case a coupling tooth 31, 32. The coupling tooth 31 cooperates with the toothing of the internally toothed ring 29 and the coupling tooth 32 cooperates with the toothing of the internally toothed ring 30. Since the internally toothed rings 29, 30 are offset with respect to each other in the radial direction the coupling teeth 31, 32 are also offset with respect to each other in the axial direction by the same amount. To enable the transmission element consisting of the internally toothed rings 29, 30 and the cable drum 28 to be made in one piece as moulding the internally toothed ring 29 comprises a greater internal diameter than the internally roothed ring 30.

The plastic-sheathed steel cable 33 comprises at its end engaging the cable drum 28 a cable eye stiffener 34 which ends in a hook 35 which can be engaged in a cutout 36 at the periphery of the cable drum 28. A pot-shaped capsule 37 is placed over the periphery of the cable drum 28 and secured with screws 38 to the body of the cable drum 28. Between the cylindrical outer periphery of the cable drum 28 receiving the steel cable 33 and the inner surface of the capsule 37 there is adequate clearance 39 for accommodating the steel cable 33 coiled up on the cable drum 28. The cable drum 28 is also rotatably mounted on the bearing pin 15; the axial securing thereof is by means of a securing ring 40 which is inserted in a groove 41 at the free end of the bearing pin 15.

The coupling described operates as follows: When the electric motor 7 is switched on the worm wheel 16 rotates with the flange 17 for example in the direction indicated by an arrow 42 in FIG. 5. The inertia disk 25 is coupled via the guide studs 21, 22 of the toothed slider 20 and via the stud-like extension 19 engaging in the radial groove 18 to the worm wheel 16. Since due to its inertia the disk 25 resists the rotational movement, by the torque generated in the manner of a crank in the region of the engagement of the extension 19 with the radial groove 18 the toothed slider 20 is moved outwardly in the radial direction indicated by the arrow 43, the guide studs 21, 22 sliding easily in the radial grooves 23, 24 of the inertia disk 25. The radial output movement of the toothed slider 20 continues until the coupling tooth 32 comes into engagement with the toothing of the internally toothed ring 30. On operation of the electric motor 7 in the opposite direction, instead of this the coupling tooth 31 comes into engagement with the toothing of the internally toothed ring 29. In this condition the coupling is engaged so that the cable drum 28 is coupled fixed in rotation to the worm wheel 16. With the direction of rotation of the cable drum 28 indicated in FIG. 5 by a further arrow 42 the steel cable 33 is wound up on the outer periphery of the cable drum 28.

Now, if the drive means fails, for example the electric motor 7 is defective or the worm gearing jams, the vehicle occupant grips the end fitting 4 and displaces it in the one or other direction. On displacement in the appropriate direction the ramp-like tooth rear flank of the coupling tooth 31 or 32 slides on the corresponding ramp of the internally toothed ring 29 or 30 in the radial direction inwardly, the respective coupling tooth thereby being brought out of engagement with the corresponding internally toothed ring. By slight to and fro movement of the end fitting 4 the coupling can thus be disengaged. Thereafter the cable drum 28 is freely rotatable so that the end fitting 4 can also be easily moved by hand in its guide rail 5. The coupling is not engaged again until the drive means operates properly, i.e. rotates the worm wheel 16 with adequate speed in order to be able to move the toothed slider 20 radially outwardly under the effect of the inertia disk 25.

Figure 6:
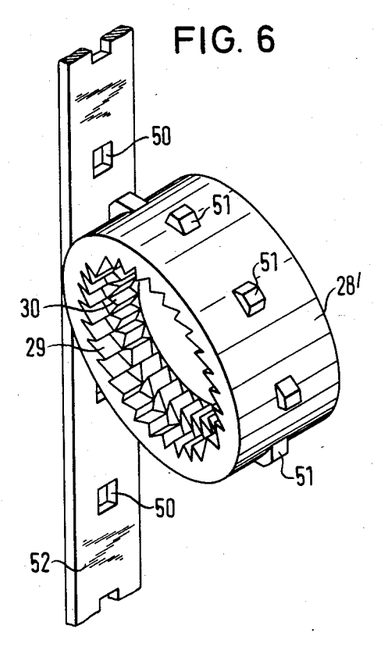
FIG. 6 is a schematic perspective view of a drive drum and a band-shaped pulling and pushing means according to a further embodiment.

In the embodiment illustrated in FIG. 6 the coupling counter member to the toothed slider 20 is a drive drum 28' which is equipped in the same manner as the cable drum 28 in the previously described embodiment with internally toothed rings 29, 30. The outer periphery of the drive drum 28' is provided with a toothing 51 which is made complementary to a perforation 50 of a drive band 52 used as pulling and pushing means. The perforation 50 consists of regularly spaced-apart holes. One end of the drive band 52, only a fragment of which is shown, is connected to the end fitting 4 whilst the other end is accommodated in a receiving means.

The embodiments described differ only in the construction of the transmission element which is in drive connection with the pulling and pushing means and which in the one case is constructed as cable drum 28 and in the other as drive drum 28. In both constructions said transmission element represents at the same time the toothed slider 20 forming the other coupling member. Furthermore, in both embodiments the transmission element is a one-piece moulding on the inner surface of which the toothed rims 29, 30.

In an embodiment illustrated in the drawings the coupling connected between the gearing 8 and the transmission element formed as drive drum or cable drum is formed as friction or form-locking coupling by an electromagnet. The control of the electromagnet is via a sensor which does not respond until the drive means is operating properly. This embodiment is more efficient than that previously described insofar as the coupling need not be disengaged firstly by slight pushing to and fro of the end fitting 4; on the contrary, the end fitting 4 is freely movable by hand directly for as long as the drive means is not operating properly. The mechanical construction of the coupling is however distinguished by simplicity and low expenditure and consequently by low production costs.

In the embodiment according to FIGS. 3 to 5 one special feature is the cylindrical peripheral surface of the cable drum 28. Conventional cable drums are made conical and are therefore not suitable for pushing on the cable, the convolutions thereof become gradually shorter as the conical receiving surface becomes full and crushing can occur. With the at least approximately cylindrical configuration of the cable drum 28, in contrast, when winding and unwinding the steel cable 33 the same peripheral length of the cable 33 is always wound or unwound per revolution of the cable drum 28 and this avoids crushing of the steel cable 33.

Figure 7:
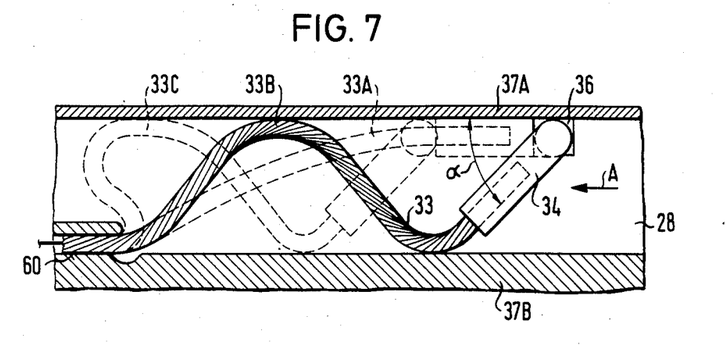
FIG. 7 is a schematic development of a portion of the peripheral surface of a drum on which a pulling and pushing means is coiled and from which it is uncoiled.

FIG. 7 shows a partial plan view of the development of the peripheral surface of a cable drum 28 which can be cylindrical or frusto-conical. The cable drum 28 is surrounded in the manner shown in FIGS. 3 and 4 by an encapsulation in the form of a capsule of which in FIG. 7 only the radial lateral boundary walls 37A and 37B are shown. The end of the pulling and pushing means constructed as cable 33 and provided with a pressed cable eye stiffener 34 is anchored to the peripheral surface of the drum 28 in that the angled end of the cable eye stiffener 34 is suspended in the recess 36 which is disposed on the one axial side of the peripheral surface of the drum 28. The angled end of the cable eye stiffener 34 is mounted pivotally in the recess or cutout 36. The cable 33 is led through an inlet and outlet opening 60 tangentially up to the periphery of the drum 28. The normal path of the cable 33 between the inlet and outlet opening 60 and its anchor point at the periphery of the drum 28 is designated by 33A in FIG. 7. It is distinguished in that the cable 33 between the inlet and outlet opening 60 and its anchor point at the drum 28 first undergoes a curvature towards the side of the anchor point, then passes through a turning point and after an arc of opposite curvature terminates in a portion which extends substantially tangentially or in the peripheral direction of the drum 28. If however there is an obstruction of the thrust movement of the cable 33 on uncoiling from the drum 28 in the uncoiling direction designated by the arrow A, for example by the movement of the end fitting being inhibited or braked shortly before reaching its end position, a compression of the cable 33 occurs so that the latter assumes the condition indicated in FIG. 7 in full lines and designated by 33B, being approximately S-shaped. The cable bears on the boundary walls 37A and 37B opposite each other. On further compression a portion of the cable 33 moves in the manner likewise indicated in FIG. 7 in dashed line into the region of the receiving space for the cable 33 which lies in the uncoiling direction A of the drum 28 behind the inlet and outlet opening 60. This condition of the cable 33 is indicated in FIG. 7 by 33C. In this condition the cable 33 is buckled and jammed in its receiving space in such a manner that the further uncoiling or coiling function of the cable 33 is impaired. In this condition 33C as in the condition 33B the end of the cable 33 provided with the cable eye stiffener 34 assumes an angle $\alpha$ of inclination to the peripheral direction of the drum 28 which permits the cable 33 to bear on the inner face of the boundary wall 37. Now, according to the invention this axial inclination angle $\alpha$ is to be limited to a value which is so small that the cable 33 is prevented from bearing on the radial boundary wall 37B. It has been found that both the S-shaped deformation (33B) of the cable 33 and the buckling (33C) thereof are then prevented in simple manner.

Figure 8:
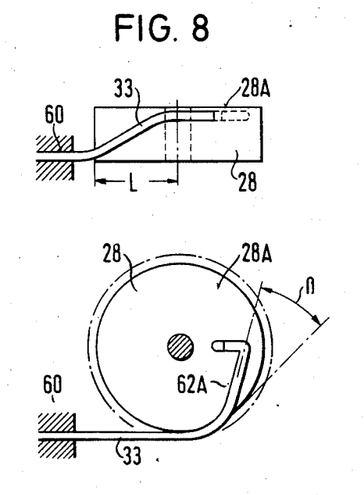
FIG. 8 is a sketch showing an embodiment with cylindrical drum in plan view and end elevation.
Figure 9:
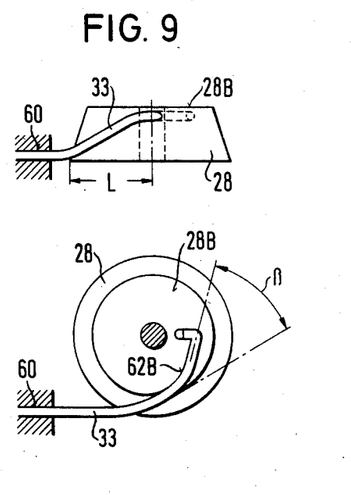
FIG. 9 is a sketch showing a further embodiment in plan view and in end elevation.

In the embodiments according to FIGS. 8 and 9 the end of the cable 33 is fixed to the end face 28A or 28B of the drum 28. In the embodiment according to FIG. 8 the drum 28 is cylindrical and in the embodiment according to FIG. 9 it is frusto-conical. In both cases the end face 28A and 28B respectively is provided with a groove-like angled recess 62A and 62B respectively in which the end of the cable 33 is suspended and anchored. As apparent from the end elevation of FIGS. 8 and 9 the cable 33 extends out of the recesses 62A and 62B at a small radial inclination angle $\beta$ and then merges into a tangential direction and passes through the inlet and outlet opening 60.

If in another embodiment not shown in the drawings the end of the cable 33 is anchored to the periphery of the drum 28, it is made without the cable eye stiffener 34 shown in FIG. 7 and preferably anchored in a recess of the peripheral face of the drum 28 extending substantially in the peripheral direction, the lateral boundary walls of said recess forming a stop for the axial inclination of the cable end. This recess is thus so dimensioned that the pivoting of the cable end corresponds at the most to an axial inclination angle which is appreciably smaller than the angle $\alpha$ in FIG. 7 and at which it is ensured that the cable 33 cannot bear on the boundary wall 37B. The magnitude which the axial inclination angle to the peripheral direction may have depends in practice on the properties of the cable used, in particular its stiffness, and on the geometrical dimensions of the drum 28. In each case it is possible to determine by simple tests how large the axial inclination of the cable end may be. As a rule it should not be greater than 45° and is generally considerably less than 45°, preferably at the most 30°.

When the end of the cable 33 has been fixed extending in the peripheral direction to the drum 28, either at the end face thereof or at the peripheral face thereof, in an advantageous embodiment of the invention steps are taken for preventing the curvature of the cable 33 from becoming too great in its end portion between the inlet and outlet opening 60 and its anchor point to the drum 28 in order to avoid damage to the cable 33. These steps consist preferably in adequate dimensioning of the length of the cable 33 so that when the end position of the end fitting 4 is reached the length L, measured in the peripheral direction, of the cable portion between the inlet and outlet opening 60 and anchor point to the drum 28 is large enough, preferably at least equal to the axial width of the drum 28. According to a further advantageous embodiment, however, the length of the cable 33 can be reduced in that a certain limited pivotability of the end of the cable 33 anchored to the drum 28 is provided. This enables the curvature of the cable 33 in its end portion to be reduced without any risk of buckling of said end portion.

I claim:

1. A passive safety belt system comprising a safety belt with an end fitting movable along a guide via a pulling and pushing means, a rotatably drivable drum to which the one end of the pulling and pushing means is anchored and on which the pulling and pushing means can be coiled under tension and uncoiled therefrom under thrust, and an encapsulation surrounding the drum in spaced relationship to form a receiving space

9 for the pulling and pushing means, an inlet and outlet opening for the pulling and pushing means being arranged on the one axial side of the periphery of said drum and orientated at least approximately tangentially to the periphery of the drum, the end of said pulling and pushing means on the opposite axial side of the drum periphery being held on the drum in such a manner that the axial inclination thereof to the peripheral direction of said drum is limited to an angle which is small enough to prevent under increased shearing stress a buckling or bending of said pulling and pushing means towards the side of said inlet and outlet opening.

2. The safety belt system according to claim 1, wherein said angle of axial inclination of the end of the pulling and pushing means to the peripheral direction of the drum is limited by stop means.

3. The passive safety belt system according to claim 2, wherein said stop means are formed by an insertion groove for inserting the end of the pulling and pushing means in the surface of the drum.

4. The passive safety belt system according to claim 1, wherein said pulling and pushing means is anchored at a radial inclination angle to the peripheral direction of the drum to the one end face thereof.

5. The system of claim 4, wherein one end face of said drum is provided with a recess for inserting the end of the pulling and pushing means.

6. The passive safety belt system according to claim 1, wherein the end of said pulling and pushing means is anchored axially pivotally to the periphery of the drum with an axial pivot angle which is limited by stop means to a maximum of about 30°.

7. The passive safety belt system according to claim 6, wherein said stop means is formed by a cutout in the peripheral surface of the drum corresponding to the axial pivot angle.

8. The passive safety belt system according to claim 1, wherein said end fitting has an end position corresponding to the pulling and pushing means being uncoiled from the drum, the anchor point of the end of the pulling and pushing means being spaced in the peripheral direction from the inlet and outlet opening a distance which is at least equal to the axial width of the drum.

9. The passive safety belt system according to claim 1, wherein said drum has a cylindrical peripheral face.

10. The passive safety belt system according to claim 1, wherein said drum has a frusto-conical peripheral face.

11. A passive safety belt system for restraining an occupant of a vehicle, said passive safety belt system comprising:
a restraining safety belt;
an end fitting connected with an end of said restraining safety belt for moving said restraining safety belt between an occupant restraining position and an occupant releasing position;
guide means for guiding said end fitting; and
drive means for moving said end fitting along said guide means, said drive means including a flexible pulling and pushing member connected with said end fitting for moving said end fitting, electric motor means for driving said pulling and pushing member, a transmission member connected with said pulling and pushing member for transmitting a driving torque thereto, and coupling means located between said transmission member and said electric motor means for establishing a driving connection

10 therebetween in response to energization of said electric motor means;
said coupling means comprising an inertia body and a radially movable coupling member for coupling said inertia body to the output of said electric motor means;
said electric motor means output comprising a flange having a radially extending groove and said coupling member having an extension which engages said radially extending groove;
said inertia body defining a radial guide which is slidably engaged by said coupling member and radially guides said coupling member as it moves therealong upon energization of said electric motor means;
said transmission member comprising internal teeth and said coupling member comprising means that engages said internal teeth upon radial displacement of said coupling member along said radial guide defined by said inertia body.

12. The system of claim 11 wherein said internal teeth are defined by two axially adjacent internally toothed rings, and said coupling member comprises at each of its radially opposite outer ends one of two coupling teeth which are offset with respect to each other in the axial direction and which cooperate with a respective internally toothed ring.

13. The system of claim 12 wherein the teeth of said internally toothed rings has a sawtooth-like cross sectional form and the teeth of one internally toothed ring is directed oppositely to that of the other.

14. The system of claim 12 wherein the internally toothed rings have different internal diameters and are combined in a single molding with the transmission member.

15. The system of claim 11 wherein said inertia body is a balanced metal disk.

16. The system of claim 11 wherein said transmission member is a cable drum, and said pulling and pushing member is a cable received on said drum, and said system further comprises an encapsulation member fitted over the outer periphery of said cable drum and defining therewith a radial spacing for receiving said pulling and pushing member.

17. The system of claim 16 wherein the outer periphery of said cable drum is at least approximately cylindrical.

18. The system of claim 11 wherein said transmission member is a drive drum having on its outer periphery a toothing, and said pushing and pulling means is a band having regularly spaced-apart drive openings which cooperate with said toothing to effect displacement of said band in response to rotation of said drum.

19. A safety belt system comprising:
a safety belt;
an end fitting connected to said safety belt for moving said safety belt between occupant restraining and occupant releasing positions;
guide means for guiding said end fitting in its movement;
drive means for moving said end fitting along said guide means;
said drive means comprising a pushing and pulling member connected at one end thereof to said end fitting and a rotatable drum to which the other end of said pushing and pulling means is connected and which is rotatable in opposite direction to coil or uncoil said pushing and pulling member and move said end fitting;

an encapsulation member surrounding the drum in spaced relationship and defining therewith a space in which said pushing and pulling member is received; and means for preventing buckling or bending of said pushing and pulling member, said preventing means comprising a recess on said drum for receiving the other end of said pushing and pulling member to anchor said pushing and pulling member to said drum, said recess extending in the peripheral direction of said drum at an angle such that said recess substantially limits pivoting of said pushing and pulling member relative to the periphery of said drum.

* * * * *